United States Patent [19]

Nayar et al.

[11] Patent Number: 5,707,483
[45] Date of Patent: Jan. 13, 1998

[54] ROTARY ACOUSTIC HORN

[75] Inventors: Satinder K. Nayar; Haregoppa S. Gopalakrishna, both of Woodbury, Minn.

[73] Assignee: Minnesota Mining and Manufacturing Company, St. Paul, Minn.

[21] Appl. No.: 676,016

[22] Filed: Jul. 5, 1996

[51] Int. Cl.⁶ ................................................. B29C 65/08
[52] U.S. Cl. ................... 156/580.2; 156/73.1; 425/174.2
[58] Field of Search ......................... 156/73.1, 555, 156/580, 580.1, 580.2; 425/174.2; 228/110.1, 1.1

[56] References Cited

U.S. PATENT DOCUMENTS

| | | | |
|---|---|---|---|
| 4,252,586 | 2/1981 | Scott | 156/73.1 |
| 4,404,052 | 9/1983 | Persson et al. | 156/73.1 |
| 4,473,432 | 9/1984 | Leader et al. | 156/582 |
| 4,534,818 | 8/1985 | Kreager et al. | 156/466 |
| 4,659,614 | 4/1987 | Vitale | 428/218 |
| 4,668,316 | 5/1987 | Sager | 156/73.1 |
| 4,681,645 | 7/1987 | Fukushima et al. | 156/73.1 |
| 5,057,182 | 10/1991 | Wuchinich | 156/580.1 |
| 5,087,320 | 2/1992 | Neuwirth | 156/580.2 |
| 5,096,532 | 3/1992 | Neuwirth et al. | 156/580.1 |
| 5,110,403 | 5/1992 | Ehlert | 156/580.1 |
| 5,552,013 | 9/1996 | Ehlert et al. | 156/555 |
| 5,562,790 | 10/1996 | Ehlert et al. | 156/73.1 |

FOREIGN PATENT DOCUMENTS

| | | |
|---|---|---|
| 671 529 | 9/1989 | China . |
| 2.082.090 | 11/1971 | France . |
| 1 704 178 | 4/1971 | Germany . |
| 42 03729 | 8/1993 | Germany . |
| 2 282 559 | 4/1995 | United Kingdom . |
| 91/10566 | 7/1991 | WIPO . |

OTHER PUBLICATIONS

Derks, "Survey of Patent Literature (Patents and Patent Applications) on Resonators with Wide Output Cross–Sections," *The Design of Ultrasonic Resonators With Wide Output Cross–Sections*, Nov. 1984.

*Primary Examiner*—James Sells
*Attorney, Agent, or Firm*—Gary L. Griswold; Walter N. Kirn; Charles D. Levine

[57] ABSTRACT

A rotary acoustic horn imparts energy at a selected wavelength, frequency, and amplitude. The horn includes a cylindrical shaft and a cylindrical welding portion mounted on and coaxial with the shaft. The diameter of the welding portion is greater than the diameter of the shaft. The welding portion has a cylindrical weld face having a diameter that expands and contracts with the application of ultrasonic energy, and first and second opposing end portions. At least one end portion is formed with a first undercut; the radial width and the depth of the first undercut is selected to affect the amplitude of vibration at the weld face to provide a desired amplitude profile along the axial length of the weld face.

23 Claims, 9 Drawing Sheets

ROTARY ACOUSTIC HORN

TECHNICAL FIELD

The present invention relates to acoustic welding horns. More particularly, the present invention relates to rotary acoustic welding horns.

BACKGROUND OF THE INVENTION

In acoustic welding, such as ultrasonic welding, two parts to be joined (typically thermoplastic parts) are placed directly below an ultrasonic horn. In plunge welding, the horn plunges (travels toward the parts) and transmits ultrasonic vibrations into the top part. The vibrations travel through the top part to the interface of the two parts. Here, the vibrational energy is converted to heat due to intermolecular friction that melts and fuses the two parts. When the vibrations stop, the two parts solidify under force, producing a weld at the joining surface.

Continuous ultrasonic welding is typically used for sealing fabrics, films, and other parts. In the continuous mode, typically the ultrasonic horn is stationary and the part is moved beneath it. Scan welding is a type of continuous welding in which the plastic part is scanned beneath one or more stationary horns. In transverse welding, both the table over which the parts pass and the part being welded remain stationary with respect to each other while moving underneath the horn or while the horn moves over them.

Many uses of ultrasonic energy for bonding and cutting thermoplastic materials involve ultrasonic horns or tools. A horn is an acoustical tool usually having a length of one-half of the horn material wavelength and made of, for example, aluminum, titanium, or sintered steel that transfers the mechanical vibratory energy to the part. (Typically, these materials have wavelengths of approximately 25 cm (10 in).) Horn displacement or amplitude is the peak-to-peak movement of the horn face. The ratio of horn output amplitude to the horn input amplitude is termed gain. Gain is a function of the ratio of the mass of the horn at the vibration input and output sections. Generally, in horns, the direction of amplitude at the face of the horn is coincident with the direction of the applied mechanical vibrations.

Traditionally, ultrasonic cutting and welding use horns which vibrate axially against a rigid anvil, with the material to be welded or cut being placed between the horn and anvil. Alternatively, in continuous high speed welding or cutting, the horn is stationary while the anvil is rotated, and the part passes between the horn and the anvil. In these cases, the linear velocity of the part is matched with the tangential velocity of the working surface of the rotating anvil.

There are, however, some limitations to this system. Because the part to be welded is continuously passed between the narrow gap formed by the anvil and the horn, compression variations are created due to part thickness nonuniformities. Drag exists between the part and the horn and may cause residual stresses in the welded region. These factors affect the weld quality and strength which, in turn, limit the line speeds. Also, the gap between the rotating anvil and the horn limits the compressible bulk or thickness of the parts to be bonded.

One way to minimize these limitations is to shape the working surface of the horn to attain a progressive convergent or divergent gap depending upon the part. This does not completely solve the problem of moving the material to be bonded past a stationary horn, as an intimate contact is needed for efficient acoustic energy transfer.

The best way to attain high quality and high speed ultrasonic welds is to use a rotary horn with a rotating anvil. Typically, a rotary horn is cylindrical and rotates around an axis. The input vibration is in the axial direction and the output vibration is in the radial direction. The horn and anvil are two cylinders close to each other, rotating in opposite directions with equal tangential velocities. The part to be bonded passes between these cylindrical surfaces at a linear velocity which equals the tangential velocity of these cylindrical surfaces. Matching the tangential velocities of the horn and the anvil with the linear velocity of the material is intended to minimize the drag between the horn and the material. The excitation in the axial direction is similar to that in conventional plunge welding.

Figure 1:
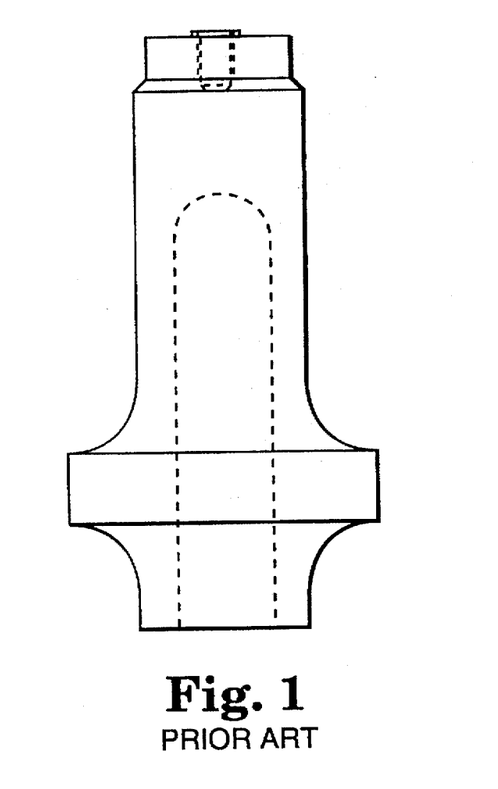
FIG. 1 is a schematic view of a Mecasonic horn.
Figure 2:
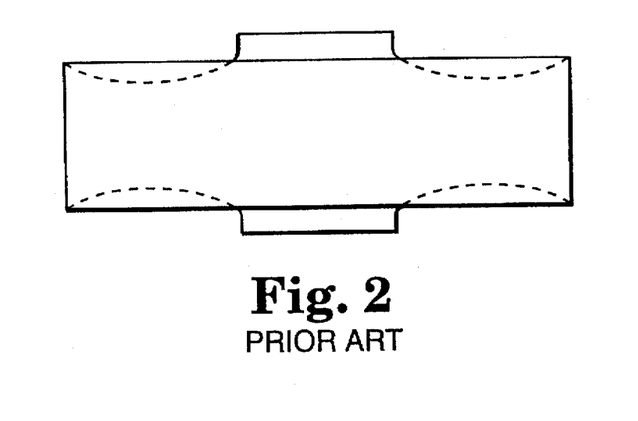
FIG. 2 is a schematic view of a '532-type horn.

U.S. Pat. No. 5,096,532 describes two classes of rotary horn. The patent compares a commercially available rotary horn, manufactured by Mecasonic-KLN, Inc. of Fullerton, Calif. (Mecasonic horn) and a rotary horn described in the '532 patent. FIG. 1 shows a Mecasonic rotary horn and FIG. 2 shows one configuration of the '532 rotary horn. One significant difference between these two types of horns is the width of the radial weld face and the uniformity of amplitude across the radial face.

The Mecasonic horn is a full wavelength horn, having a total length of about 25 cm (10 in) for aluminum and titanium horns. The axial vibration excites the cylindrical bending mode to provide the radial motion, and the mode of vibration depends on Poisson's ratio. (If the Poisson's ratio of the horn material is zero, the radial modes of vibration are not excited.) The radial motion of the weld face is in phase with the excitation, and there are two nodes (where the amplitude of vibration is zero) for the axial motion, and two nodes for radial motion. However, the amplitude of vibration is the highest at the center of the radial weld face and diminishes toward the end, resulting in uneven weld strength. The Mecasonic horn is a partially hollowed cylinder.

The '532 horn is a half wavelength horn, having a total length of about 12.7 cm (5 in) for aluminum and titanium horns. Due to the shape of the horn, the axial vibration provides the radial motion. In this horn, the mode of vibration is independent of Poisson's ratio. The radial motion of the weld face is out of phase with the excitation, and there is only one node, at the geometric center of the weld face. The amplitude of vibration is relatively uniform across the weld face. The shape of the '532 horn differs from that of the Mecasonic horn; the '532 horn is solid, and the Mecasonic horn is a partially hollowed cylinder.

There is a need for an acoustic horn which can weld parts over a relatively wide width (such as 12.7 cm) with a controlled amplitude profile.

SUMMARY OF THE INVENTION

A rotary acoustic horn imparts energy at a selected wavelength, frequency, and amplitude. The horn includes a cylindrical shaft with input and output ends, and a cylindrical welding portion mounted on and coaxial with the output end. The diameter of the welding portion is greater than the diameter of the shaft. The welding portion has a cylindrical weld face having a diameter that expands and contracts with the application of acoustic energy, and first and second opposing end portions. At least one end portion is formed with a first cylindrical undercut; the radial width and the depth of the first undercut is selected to affect the amplitude of vibration at the cylindrical weld face to provide a desired amplitude profile along the axial length of the cylindrical weld face.

The radial width and the depth of the first undercut is selected to affect the amplitude of vibration at the weld face to provide an amplitude profile that can be substantially uniform along the entire axial length of the weld face; greater at the axial ends of the weld face than at the axial center; greater at the axial center of the weld face than at the axial ends; and increasing from one axial end of the weld face to the other axial end. Any of these amplitude profiles is attainable.

The first undercut can have an inner radius that is coextensive with an outer radius of the shaft. Another first undercut can be formed in the other end portion of the welding portion.

The horn can include a second cylindrical undercut in the same end portion as the first undercut. The second undercut can be closer to the weld face than the first undercut and the depth of the second undercut can be less than the depth of the first undercut.

The shaft can be hollow for at least part of its axial length.

The axial length of the welding portion can be up to one-half of a wavelength of the horn material. In one embodiment, the axial length of the horn can be substantially equal to one wavelength of the horn material. In this embodiment, the weld face expansion and contraction can be substantially in phase with the movement of the input end of the horn. The horn can exhibit two nodal points for axial motion. In another embodiment, the axial length of the horn can be less than or equal to one-half wavelength of the horn material. In this embodiment, the weld face expansion and contraction can be substantially out of phase with the movement of the input end of the horn. This horn can exhibit one nodal point for axial motion.

Also, the shaft can be shorter than the desired length of the horn with the welding portion located so that it extends beyond the end of the shaft to make the entire horn the desired length.

A shaft extension can be located at the output end of the horn. The shaft extension can extend beyond the welding portion by a distance of one or more multiples of one-half wavelength of the horn material.

The horn can include a plurality of coaxial welding portions mounted on the shaft. The welding portions are spaced from each other. The welding portions can be mounted in series or in parallel with each other. The distance between midpoints of adjacent welding portions can be one or more multiples of one-half wavelength of the horn material. Also, the amplitude of vibration of each welding portion can differ from the amplitude of vibration of adjacent welding portions.

The horn can be an ultrasonic horn. Changing the mass at the input end of the horn can change the gain at the radial weld face.

DETAILED DESCRIPTION

Figure 10:
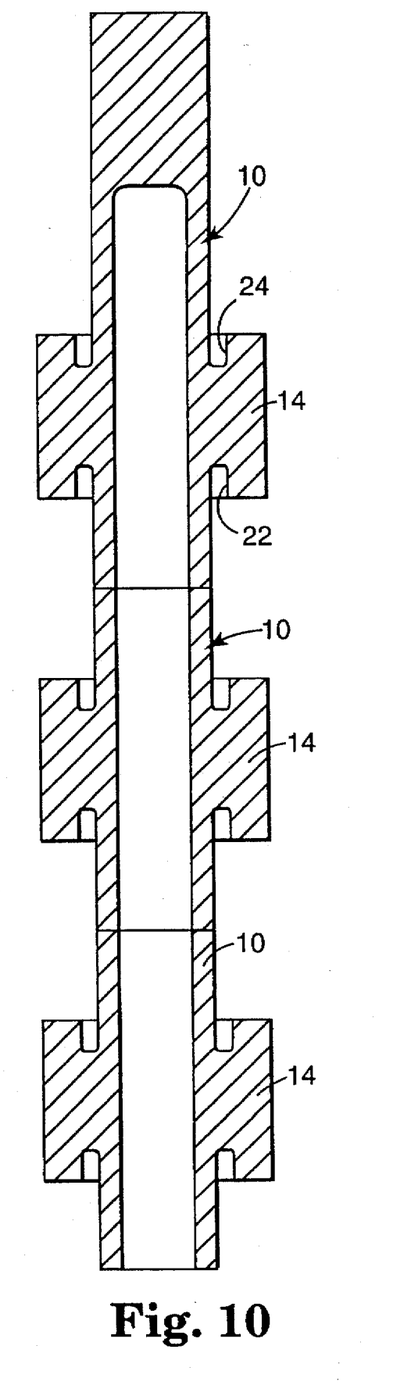
FIG. 10 is a schematic view of a horn according to another embodiment of the invention having multiple welding portions in series.
Figure 11:
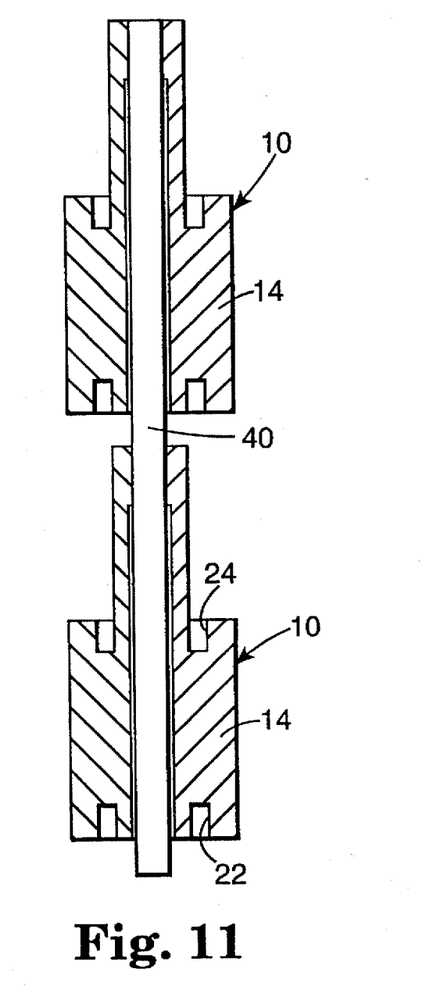
FIG. 11 is a schematic view of a horn according to another embodiment of the invention having multiple welding portions in parallel.
Figure 12:
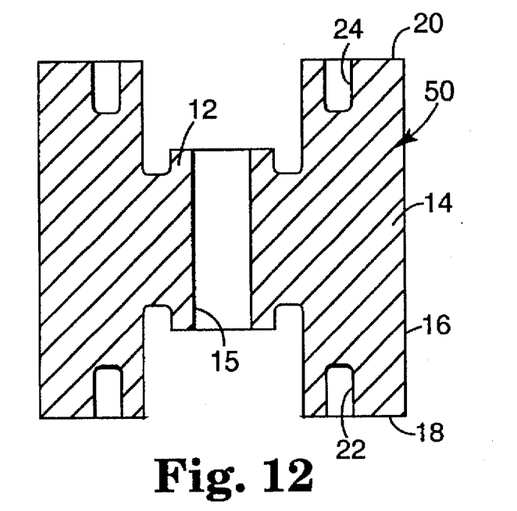
FIG. 12 is a schematic view of a horn according to another embodiment of the invention.
Figure 13:
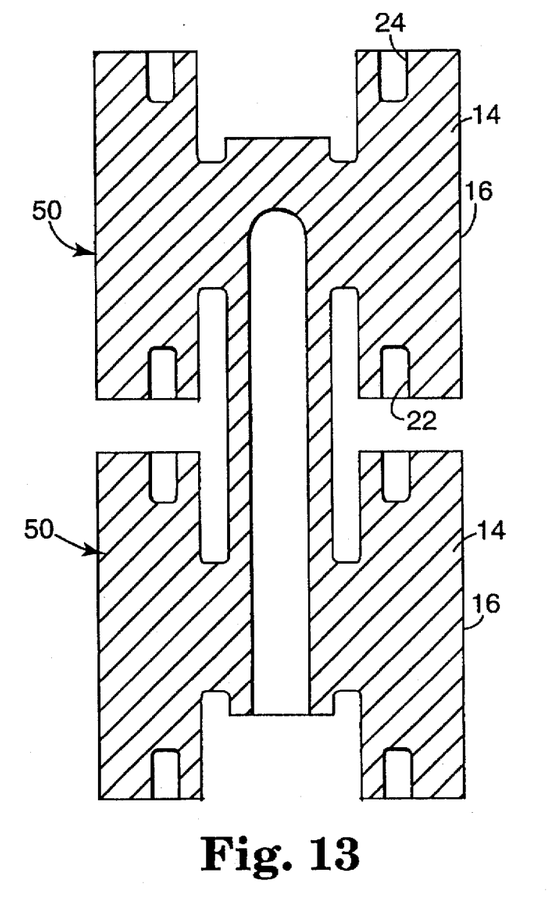
FIG. 13 is a schematic view of the horn of FIG. 12 having multiple welding portions in series.
Figure 14:
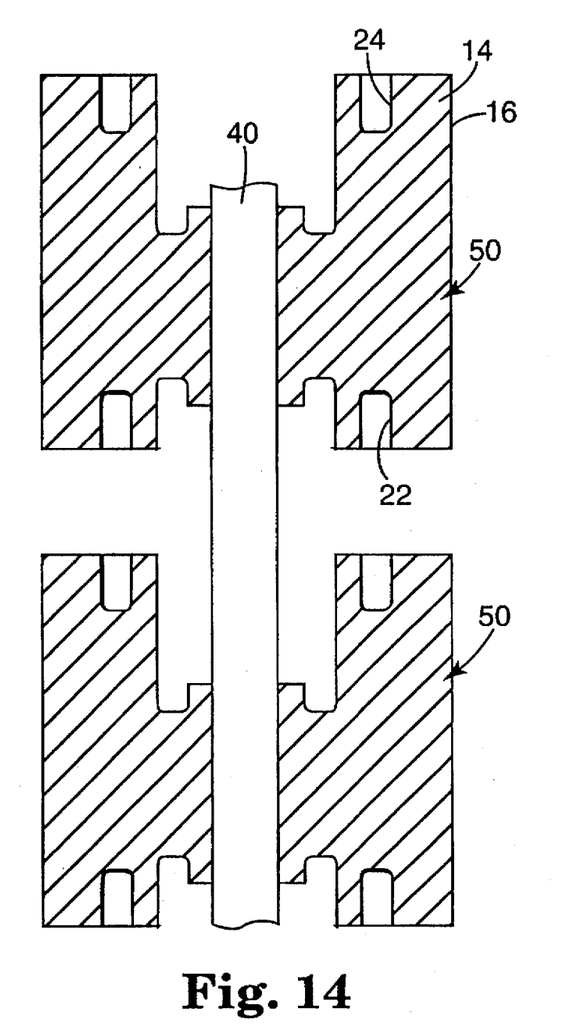
FIG. 14 is a schematic view of the horn of FIG. 12 having multiple welding portions in parallel.

The rotary horn of this invention can be a full wavelength, acoustic rotary horn, as shown in FIGS. 1–11, although half wavelength horns can also be used, as shown in FIGS. 12–14. As shown, the horn is an ultrasonic horn. The horn imparts energy at a selected wavelength, frequency, and amplitude. The horn can ultrasonically weld parts over a relatively long width with a desired (often constant) amplitude. The rotary horn maintains a controlled amplitude across the weld face width by placing an undercut between the inner cylinder and the radial weld face.

For the full wavelength horn, the radial motion is in phase with the excitation and the horn has two nodal points for the axial motion and two nodal points for the radial motion. For the half wavelength horn, the radial motion is out of phase with the excitation and the horn has one nodal point for the axial motion and one nodal point for the radial motion.

Figure 3:
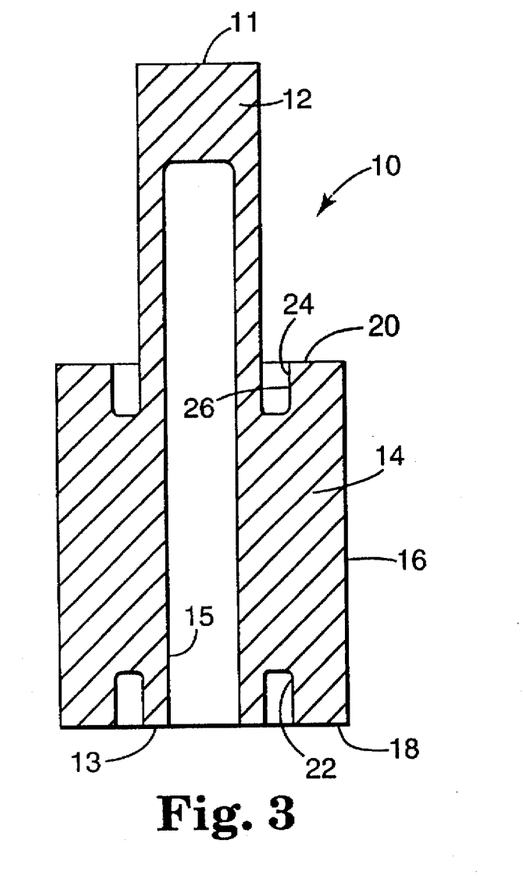
FIG. 3 is a schematic view of a horn of the present invention.
Figure 4:
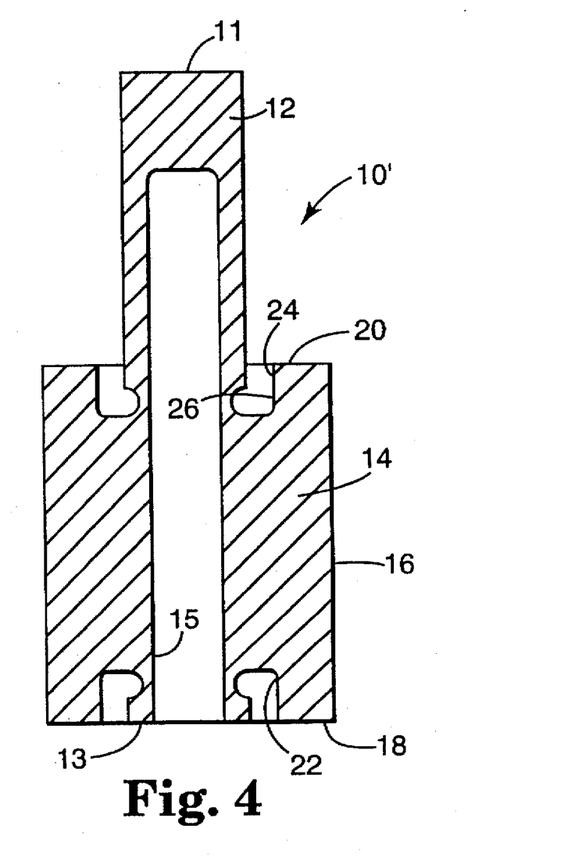
FIG. 4 is a schematic view of an outer radius of the cylindrical shaft having a reduced portion.
Figure 5:
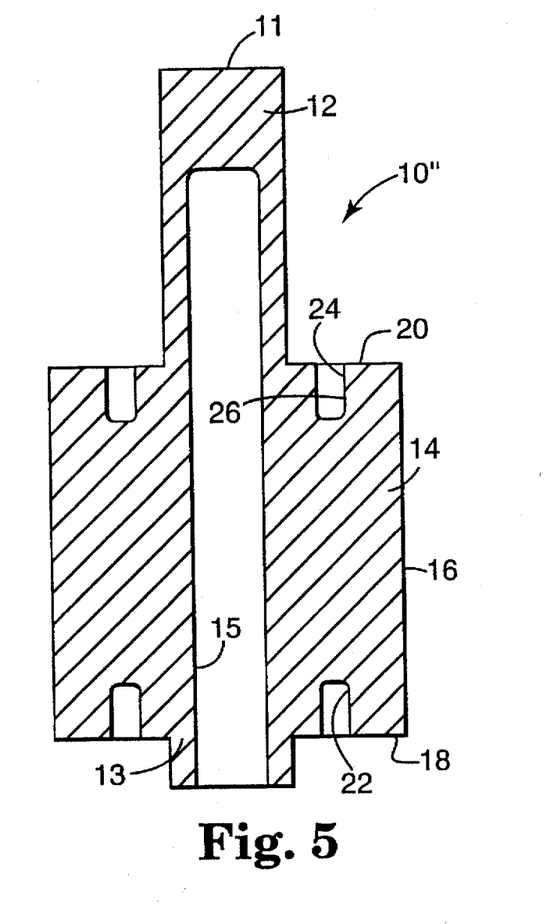
FIG. 5 is a schematic view of undercuts having inner radii that are not coextensive with the outer radius of the cylindrical shaft.

The rotary horn 10, shown in FIG. 3, includes a cylindrical shaft 12 having an axial input end 11 and an axial output end 13. A cylindrical welding portion 14 is mounted on and coaxial with the shaft 12. The shaft 12 can have a hollow portion 15. This hollow portion 15 can extend for more than half of the axial length of the shaft 12 and can be longer than the welding portion 14. Also, the shaft can extend for more than half of the axial length of the welding portion.

The diameter of the cylindrical welding portion 14 is greater than the diameter of the cylindrical shaft 12. As shown, the welding portion 14 has a radially outer cylindrical weld face 16 having a diameter that expands and contracts with the application of ultrasonic energy. First and second opposing end portions 18, 20 are formed on the ends of the welding portion 14. At least one end portion 18, 20 is formed with a first cylindrical undercut 22, 24. The Figures show undercuts 22, 24 in both end portions 18, 20 and show that the undercuts have inner radii that are coextensive with the outer radius of the cylindrical shaft 12. The undercuts 22, 24 can have the same or different widths and depths. The outer radius of the cylindrical shaft 12 need not be constant along its length. The outer radius can have a reduced portion, whether coextensive with the inner radius of the undercuts or not, as shown on the horn 10' in FIG. 4. Also, the undercuts 22, 24 need not have inner radii that are coextensive with the outer radius of the cylindrical shaft as shown on the horn 10" in FIG. 5.

The radially outer surface that forms the first cylindrical undercut 22, 24 forms an inner cylindrical wall 26 of the welding portion 14. The radial width and the depth of the first undercut is selected to affect the amplitude of vibration at the weld face 16 to provide a desired amplitude profile along the axial length of the weld face 16.

Figure 6A:
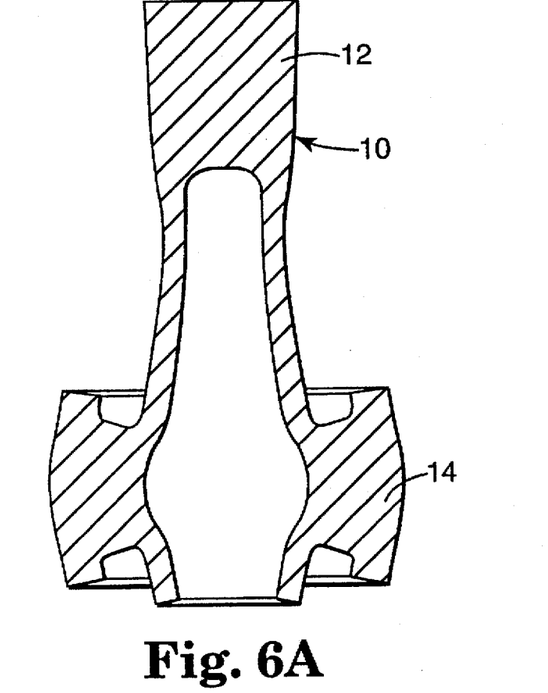
FIGS. 6A and 6B are schematic views showing the effect of shallow and deep undercuts to control the amplitude.
Figure 6B:
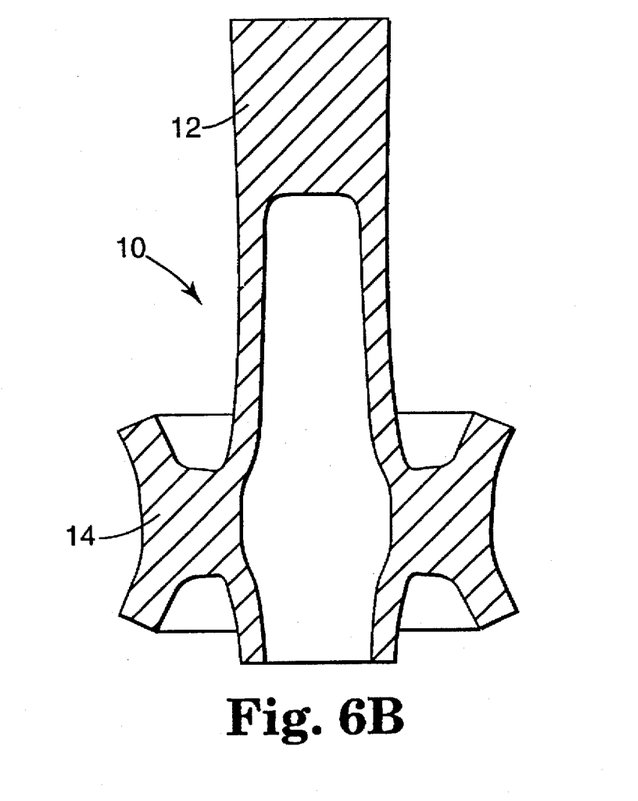

By using and placing the undercuts 22, 24 and the welding portions 14 at precise locations, the magnitude and variation in the amplitude of the weld face 16 can be controlled. The bending of the shaft 12 can be matched with the bending of the welding portion 14 to give a uniform amplitude across the radial weld face 16. While vibrating, the loading is coming from the inertial effect of the mass. If higher amplitude at the center of the weld face 16 is desired then the undercuts 22, 24 can be made shallower, as shown in exaggerated form, in FIG. 6A. If the undercuts 22, 24 are deeper, then the amplitude at the ends of the weld face 16 is higher and tapers off toward the center as shown in FIG. 6B. Thus, to obtain uniform amplitude, an optimum undercut depth is chosen.

Additionally, the center of the weld face 16 should be placed at the point of maximum deflection in the radial direction of the shaft 12. This is a nodal point for the axial motion of the horn 10. If the center of the weld face 16 is shifted above the maximum deflection point, the amplitude at the bottom is higher than the top. If the weld face 16 is placed below the maximum deflection point, the amplitude at the top is higher. The undercuts 22, 24 and the placement of the weld face 16 on the shaft 12 controls the amplitude variation along the weld face 16. The main features for the radial deflection for these rotary horns 10 are based on the thickness of the welding portion 14; the width and depth of the undercuts 22, 24; and the axial location of the welding portion 14 on the shaft 12.

FIG. 3 shows the rotary horn 10 having a weld width of up to 12.7 (5 in). The uniformity of the amplitude is dependent on the placement of the weld face 16 and the depth and width of the undercuts 22, 24. The magnitude of the amplitude is material dependent and is limited to the fatigue limit of the horn material being used. For example, tests have shown that for a 12.7 cm (5 in) weld width horn, by using undercuts which are approximately 1 cm (0.4 in) wide and 1.5 cm (0.6 in) deep, an amplitude of 0.0076 cm (0.003 in) peak-to-peak can be attained, with the amplitude varying by no more than 15%. To achieve a higher amplitude at the radial weld face 16, the depth of the undercuts 22, 24 is increased. This results in more flexure at the end of the weld face 16, resulting in higher amplitude at the ends.

Figure 7:
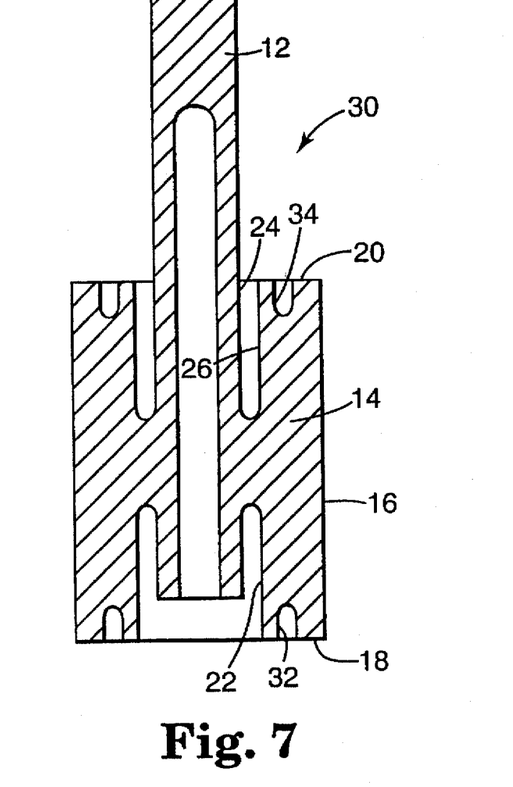
FIG. 7 is a schematic view of a horn according to another embodiment of the invention having two undercuts.

To better control this amplitude variance, another modification of the rotary horn 30 achieves uniform amplitude at the weld face 16 by using additional undercuts in the welding portion 16. This is shown in FIG. 7. This horn 30 includes a respective second cylindrical undercut 32, 34 in each end portion 18, 20. Each second undercut 32, 34 is closer to the weld face 16 than the first undercuts 22, 24 and typically the depth of the second undercuts 32, 34 is less than the depth of the first undercuts 22, 24. This design also achieves a higher magnitude of amplitude of vibration. Another modification of the horn 30 shown in FIG. 7 is that the shaft 12 is shorter than the desired length of the horn and the welding portion 14 is located so that it extends beyond the end of the shaft 12 to make the entire horn the desired length. Thus, the inner wall of the first undercut 22 is shorter than the inner wall of the first undercut 24. The shaft 12 can be shortened so that the axial length of the shaft is less than the length of the welding portion 14 as shown on the horn 50 in FIG. 12.

The horn 30 is based on the same principal as the horn 10; varying the depth and width of the undercuts achieves uniformity and higher magnitude of the amplitude of vibration. By using one, two, or more undercuts, the bending and flexing of the cylindrical welding portion can be varied and controlled. Using multiple undercuts also helps achieve a controlled profile of the magnitude and uniformity of the amplitude of the vibration at the radial weld face.

Figure 8:
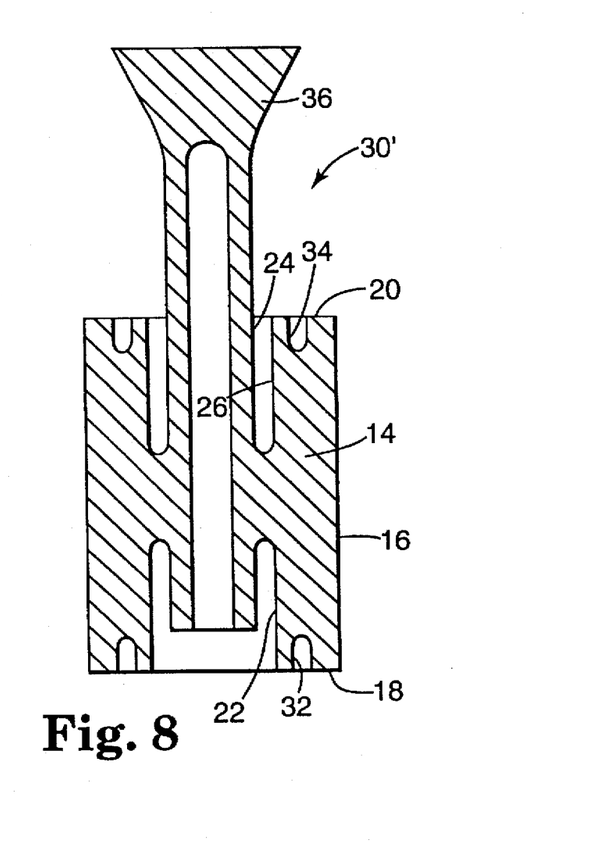
FIG. 8 is a schematic view of a horn according to another embodiment of the invention having additional mass at the input section.
Figure 9:
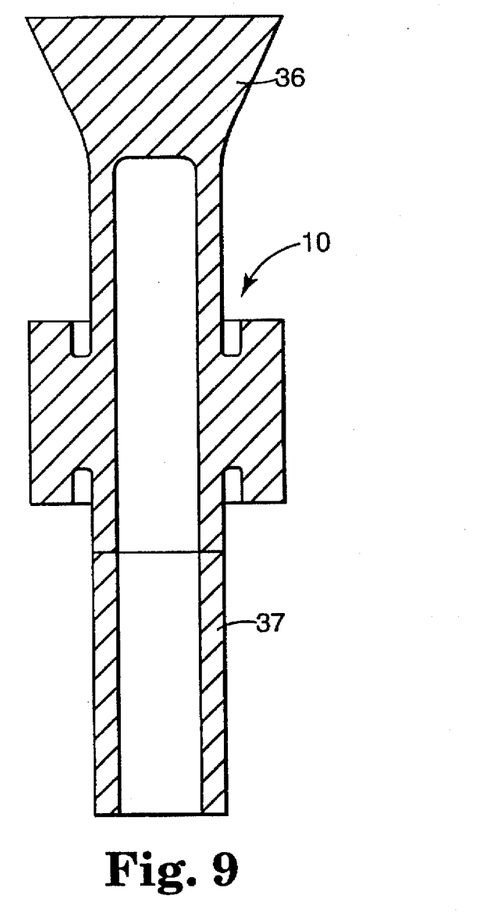
FIG. 9 is a schematic view of a horn according to another embodiment of the invention having an extension.

The gain (ratio of horn output amplitude to horn input amplitude based on the axial input) is changed at the weld face 16 by changing the mass at the input section 36 of the horn. This mass change at the input section can be done for any of the designs in FIGS. 3, 4, 5, and 7 to change gain. These changes are shown in FIGS. 8 and 9 as a mass increase on horns 30' and 10, respectively, which increases gain.

All of the horns of this invention can be extended. In FIG. 9 the shaft of the rotary horn 10 of the type shown in FIG. 3 is extended by one-half wavelength. It can also be extended by any multiple of one-half wavelength. The extension 37 can be a separate component mounted on the output end of the horn or it can be formed integrally as one piece with the rest of the horn. This still yields the same amplitude at the weld face at the horn frequency.

All of the horns of this invention can have a weld face length of up to 12.7 cm (5 in). To weld on an anvil with a width more than 12.7 cm without using multiple rotary horns (whether on rotary or flat anvils), the horns of FIGS. 3, 4, 5, 7, 8, 9, and 12 can be stacked along their length in a single unit. The configuration would look similar to a "shish-kabob" structure. A typical multiple weld face horn is shown in FIG. 10. The welding portions 16 should be placed at the correct bending position of the shaft 12 to achieve similar amplitude distribution at the radial weld face of the successive welding portions. Also the spacing between adjacent welding portions 14 must be selected so that during welding of a part of relatively constant thickness, the amplitude of vibration at each welding portion is uniform.

The length of this structure with multiple welding portions can be a multiple of the wavelength of the horn material being used. The attachment of the successive welding portions to the inner cylinder is at a distance (center-to-center distance between adjacent welding portions) of one-half wavelength of the horn material. If desired, the intermediate welding portions can be skipped so that the welding portions are positioned at full wavelength of the horn material. This may be particularly necessary if the weld face width gets wider.

The stacked structure can be made by stacking individual horns or by machining a single, integrally formed of one piece structure. In the latter version, the hollow portion 15 of the cylindrical shaft 12 can extend past several welding portions 14.

The stacked configuration can be classified as stacking the rotary horn in series, as shown in FIGS. 10 and 13, because the output of one horn in the axial direction becomes the input to the next horn. The first rotary horn drives the second rotary horn and so on.

In another variation of the stacked configuration, the rotary horns can be stacked in parallel. This is shown in FIGS. 11 and 14, with two or more horns stacked along their length using a resonating rod 40. This configuration is a parallel system because the main driving or input source is the rod or cylindrical horn that connects the rotary horns. Using this configuration, a rotary horn can be driven independently of the rotary horn that precedes it. The length of this configuration is an integer multiple of the wavelength of the material used.

The features of the horns of FIGS. 3, 4, 5, 7, 8, 9, 10, 11, and 12 can be combined in any way, mixing and matching the number of welding portions, undercuts, and other features. The various versions of the horn of this invention differ from and improve upon the Mecasonic horn in several important areas. Radial motion and amplitude is uniform and is achieved by undercuts and positioning of the weld portion 14 along the shaft 12 (as opposed to varying and decreasing amplitudes toward the ends of the Mecasonic horn). A weld face of up to 12.7 cm (5 in) wide can be attained with uniform amplitudes (as opposed to 2.5 cm (1 in) weld faces with varying amplitudes for the Mecasonic horn). For example, a gain of up to 4, with a 3.0 mil average radial amplitude has been achieved (as opposed to a gain of 1.23 at the midpoint and an average radial amplitude of 1.5 mil for the Mecasonic horn). The horns of this invention can control the amplitude variations by changing the depths and widths of the undercuts and positions and the thickness of the welding portion (as opposed to the Mecasonic horn which can not control the radial amplitude profile). Also, the horns of this invention permit interconnecting multiple welding portions in series or parallel, as well as changing the mass at the excitation point to achieve higher or lower gain.

The amplitude of ultrasonic vibration, and its uniformity, are affected by the dimensions (such as the radial width and depth of the cylindrical undercuts), the thickness of the cylindrical welding portion that is radially outside of the cylindrical undercuts, the thickness of the cylindrical shaft, and the length of the cylindrical welding portion weld face.

The inner shaft and the outer welding portion have been described as concentric cylinders of constant diameter. However, the cylinders could have varying radii or be non-concentric, and the welding portion need not be cylindrical to work with various welding configurations. For example, the welding portion could be a non-cylindrical conic section. It could be elliptical in the radial direction or can be spherical. Also, the undercuts, described in the illustrated embodiments as continuous in the circumferential direction, can have varying depth or width or both and need not extend around the entire circumference of the welding portion.

We claim:

1. A rotary acoustic horn for imparting energy at a selected wavelength, frequency, and amplitude, wherein the horn comprises:

a shaft having an axial input end and an axial output end;

a welding portion mounted on the shaft, and having a diameter that is greater than the diameter of the shaft, wherein the welding portion comprises a weld face having a diameter that expands and contracts with the application of acoustic energy to the input end of the shaft, and first and second opposing end portions, wherein at least one end portion is formed with a first undercut, wherein the first undercut has a width and depth selected to control the amplitude of vibration at the weld face to provide a desired amplitude profile along the axial length of the weld face.

2. The horn of claim 1 wherein the width and the depth of the first undercut are selected to affect the amplitude of vibration at the weld face to provide an amplitude profile that is one of: substantially uniform along the entire axial length of the weld face; greater at the axial ends of the weld face than at the axial center; greater at the axial center of the weld face than at the axial ends; and increasing from one axial end of the weld face to the other axial end, wherein any of the amplitude profiles is attainable.

3. The horn of claim 1 wherein the first undercut has an inner radius that is one of coextensive and non-coextensive with an outer radius of the shaft.

4. The horn of claim 1 further comprising a first undercut formed in the other end portion of the welding portion.

5. The horn of claim 1 further comprising a second undercut in the same end portion as the first undercut.

6. The horn of claim 5 wherein the second undercut is closer to the weld face than the first undercut.

7. The horn of claim 6 wherein the second undercut has a width and depth at least one of which is one of: less than, more than, and equal to the respective depth and width of the first undercut.

8. The horn of claim 1 wherein the axial length of the welding portion can be up to one-half of a wavelength of the horn material.

9. The horn of claim 8 wherein the axial length of the horn is one of (a) substantially equal to one wavelength of the horn material and (b) no more than one-half wavelength of the horn material.

10. The horn of claim 9 wherein the shaft is hollow for at least part of its axial length.

11. The horn of claim 9 wherein the shaft is shorter than one wavelength of the horn material and the welding portion is located so that it extends beyond the end of the shaft to make the entire horn the desired length.

12. The horn of claim 9 further comprising a shaft extension at the output end of the horn.

13. The horn of claim 12 wherein the shaft extension extends beyond the welding portion by a distance of one or more multiples of one-half wavelength of the horn material.

14. The horn of claim 1 wherein the shaft is cylindrical, the welding portion is cylindrical, and the welding portion is coaxial with the shaft.

15. The horn of claim 1 wherein the first undercut is one of continuous and discontinuous around the shaft, and wherein the depth and width of the first undercut each are one of constant and varying.

16. The horn of claim 1 wherein the weld face expansion and contraction moves substantially in phase with the movement of the axial input end of the horn and wherein the horn exhibits two nodal points for axial motion.

17. The horn of claim 1 wherein the weld portion is mounted on and coaxial with the shaft.

18. The horn of claim 1 wherein the weld face expansion and contraction moves substantially out of phase with the movement of the axial input end of the horn and wherein the horn exhibits one nodal point for axial motion.

19. The horn of claim 1 which is an ultrasonic horn.

20. The horn of claim 1 further comprising means for changing the gain at the radial weld face by changing the mass at the axial input end of the horn.

21. The horn of claim 1 comprising a plurality of coaxial welding portions mounted on the shaft, wherein the welding portions are spaced from each other, and wherein the welding portions are mounted in one of series and parallel with each other.

22. The horn of claim 21 wherein the distance between midpoints of adjacent welding portions is at least one multiple of one-half wavelength of the horn material.

23. The horn of claim 21 wherein the amplitude of vibration of each welding portion differs from the amplitude of vibration of adjacent welding portions.

* * * * *